(12) United States Patent
Fisher et al.

(10) Patent No.: US 6,879,702 B1
(45) Date of Patent: Apr. 12, 2005

(54) DIGITAL IMAGE GEOGRAPHICAL SPECIAL INTEREST GUIDE

(75) Inventors: Clay Harvey Fisher, Belmont, CA (US); Neal Jacob Manowitz, Woodcliff Lake, NJ (US); Robert Jay Sato, Fort Lee, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 624 days.

(21) Appl. No.: 09/737,517

(22) Filed: Dec. 13, 2000

Related U.S. Application Data

(60) Provisional application No. 60/181,812, filed on Feb. 11, 2000.

(51) Int. Cl.[7] .............................. G06K 9/00; G06K 9/54; G09B 25/06; G06F 17/60

(52) U.S. Cl. ...................... 382/100; 382/305; 434/130; 434/150; 705/14; 705/26

(58) Field of Search ................................ 382/300–310, 382/100; 707/104.1; 705/79, 14, 26, 27; 434/130, 150

(56) References Cited

U.S. PATENT DOCUMENTS

| | | | | |
|---|---|---|---|---|
| 5,559,707 A | * | 9/1996 | DeLorme et al. | 701/200 |
| 5,852,810 A | * | 12/1998 | Sotiroff et al. | 705/27 |
| 5,948,040 A | * | 9/1999 | DeLorme et al. | 701/201 |
| 6,240,360 B1 | * | 5/2001 | Phelan | 701/208 |
| 6,312,337 B1 | * | 11/2001 | Edwards et al. | 463/42 |
| 6,324,538 B1 | * | 11/2001 | Wesinger et al. | 707/10 |
| 6,343,738 B1 | * | 2/2002 | Ogilvie | 235/381 |
| 6,583,799 B1 | * | 6/2003 | Manolis et al. | 345/838 |

* cited by examiner

*Primary Examiner*—Jon Chang
*Assistant Examiner*—Wesley Tucker
(74) *Attorney, Agent, or Firm*—Blakely, Sokoloff, Taylor & Zafman LLP

(57) ABSTRACT

The present invention generates a digital image geographical special interest guide. According to one aspect, digital images are processed and associated with a category on a geographical map. A digital image geographical special interest guide corresponding to a category is generated. The digital image geographical special interest guide containing the associated digital images is provided to a user. A digital image geographical special interest guide aids people in easily locating detailed information on any of the available categories.

45 Claims, 4 Drawing Sheets

US 6,879,702 B1

DIGITAL IMAGE GEOGRAPHICAL SPECIAL INTEREST GUIDE

RELATED APPLICATIONS

This application claims the benefit of U.S. Provisional Application No. 60/181,812, filed Feb. 11, 2000.

FIELD OF THE INVENTION

The present invention relates to computer generated digital images. More particularly, the present invention relates to generating a digital image geographical special interest guide for users of networked computers.

COPYRIGHT NOTICE/PERMISSION

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1999, Sony Electronics, Inc., All Rights Reserved.

BACKGROUND OF THE INVENTION

Reference guides have become increasingly popular due to the growth in the travel industry. Printed reference guides currently exist for various cities and can be found in variety of bookstores. Printed reference guides provide users information about landmarks and other points of interest by describing the landmarks and points of interest and providing related pictures.

A problem with the printed reference guide is that it is not interactive and may not readily available to users across the country. In the high-tech world, information needs to be easily available from anywhere and at anytime. The printed reference guides are printed once every year or a certain period and are not updated frequently. Also the content in the reference guides is provided mostly by the editor or company publishing the reference guide and does not allow much, if any, user interaction.

Some reference information for particular cities also exists online on the Internet However the information available is not comprehensive nor does it allow user interaction that would continuously enhance the information. Thus reference guides that currently exist lack recent pictures and information and are not complete for their intended use.

SUMMARY OF THE INVENTION

The present invention generates a digital image geographical special interest guide. According to one aspect, digital images are processed and associated with a category on a geographical map. A digital image geographical special interest guide corresponding to a category is generated. The digital image geographical special interest guide containing the associated digital images is provided to a user. A digital image geographical special interest guide aids people in easily locating detailed information on any of the available categories.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

Figure 1A:
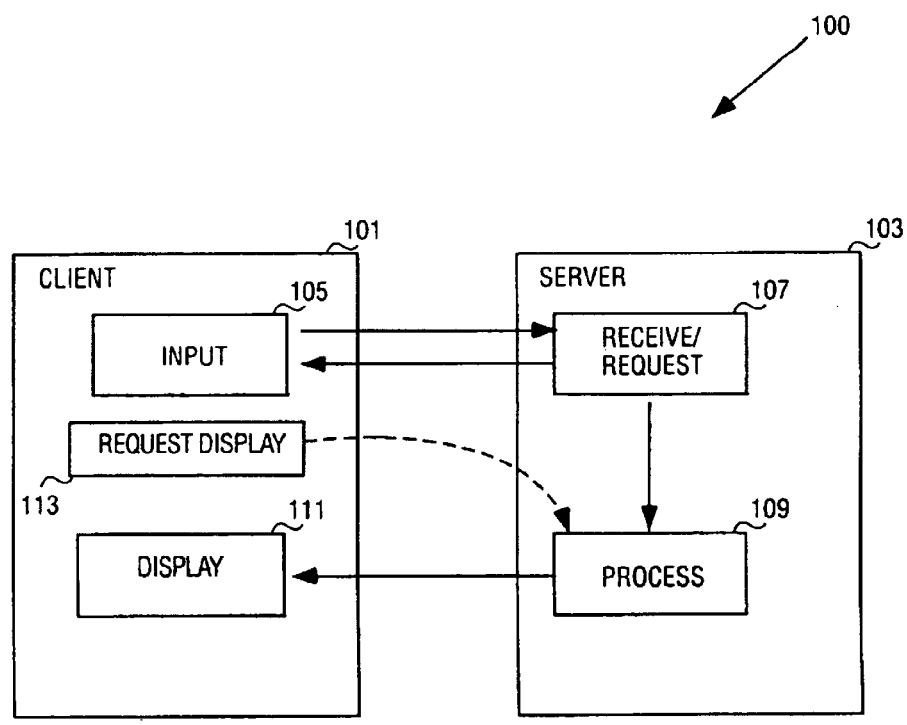
FIG. 1A is a block diagram of one embodiment illustrating an overview of the operation.

Beginning with an overview of the operation of the invention, FIG. 1A illustrates one embodiment of a digital image geographical special interest guide system 100. The digital image geographical special interest guide may have one or more clients 101 interacting with one or more servers 103 to generate a digital image geographical special interest guide. The server 103 and the client 101 communicate directly with each other. Alternatively, the server 103 and the client 101 communicate through an intermediary such as a caching proxy server.

In one embodiment, the server 103 and client 101 interact with each other for sending various types of data, such as different types of streaming media data in various formats. In one embodiment, the streaming media data is sent in a downstream direction from server 103 to client 101. In another embodiment the client 101 sends a request and other streaming media data information to server 103.

In one embodiment, a client 101 sends digital images through input 105 to the server 103. Digital images are any one or combination of any digital photographs, video frames, or analog scanned photographs. The input may be through the use of several types of electronic devices and methods commonly known, for example, a stand-alone computer, a networked system, and an online World Wide Web submission.

In another embodiment, the client 101 sends digital images to the server 103 in response to a request by the server 103 to send digital images. The server 103 makes the request by posting information on a web page inviting users of the digital image geographical special interest guide system to submit digital images for various categories. Alternatively, the server 103 retains information identifying prior users of the digital image geographical special interest guide system and send the prior users emails requesting submission of digital images for various categories.

The server 103 receives the digital images from the client 101, and posts the received digital images in the receive/request area 107.

The server 103 sends the digital images posted in receive/request area 107 to process area 109 for processing. The processing performed at processing area 109 includes creating categories, associating digital images with a category, storing the associated digital images, indicating availability of digital images to a client 101, and displaying a digital image geographical special interest guide to the client 101.

The server 103 stores the associated digital images in local memory. Alternatively, the associated digital images are stored in any other external memory device or mass storage. In one embodiment, the stored digital images are accessible by the client 101 through hotlinks generated by the server and displayed on an Internet web page.

In another embodiment, the client 101 sends a request through input 105 to the server 103 to generate digital image geographical special interest guide for a category. The client 101 makes the request by selecting a hotlink created by the server 103 on an Internet web page corresponding to the desired category. Alternatively, the client 101 may also make a request by sending an email to server's 103 webmaster and indicating the desired category for the digital image geographical special interest guide.

The server receives the request from the client 101 in its receive/request area 107. The request is sent to process area 109 for processing. The processing performed at process area 109 includes evaluating the request, retrieving stored digital images associated with the request, generating a digital image geographical special interest guide for the category requested, displaying the generated digital image geographical special interest guide to the client 101, and optionally, charging the client for displaying the digital image geographical special interest guide. The generated digital image geographical special interest guide is sent from the server's 103 processing area 109 to the client's 101 display area 111 for display. The display may be a PLAY function on a video, television screen, computer screen, or may be a video clip or PLAY function on an online system. Alternatively, the client 101 makes a request from its receive/request area 113 for the server 103 to send the generated digital image geographical special interest guide to the client's 101 display area 111 for display.

Figure 1B:
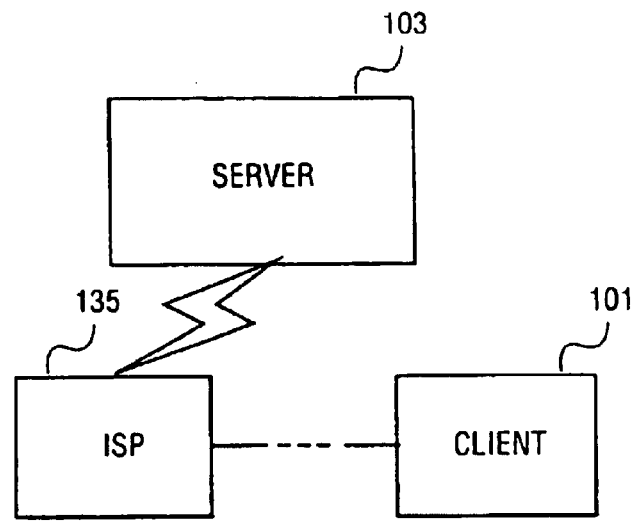
FIGS. 1B and 1C are block diagrams of an exemplary digital computer processing environment suitable for practicing the invention according to one embodiment.

In one embodiment, as shown in FIG. 1B, digital image geographical special interest guide processing server computer 103 hosts a submission and mapping web site and is part of, or coupled to, an ISP (Internet Service Provider) 135 to provide a digital image geographical special interest guide. Client computer 101 for the input 105 and the display 113 executes a conventional Internet browsing application to exchange data with the server 103. It is readily apparent that the present invention is not limited to Internet access and Internet web-based sites; directly coupled and private networks are also contemplated. In one embodiment, the server 103 and the client 101 are on separate local area networks (LAN). In another embodiment the server 103 and the client 101 are connected through a wide area network (WAN).

Figure 1C:
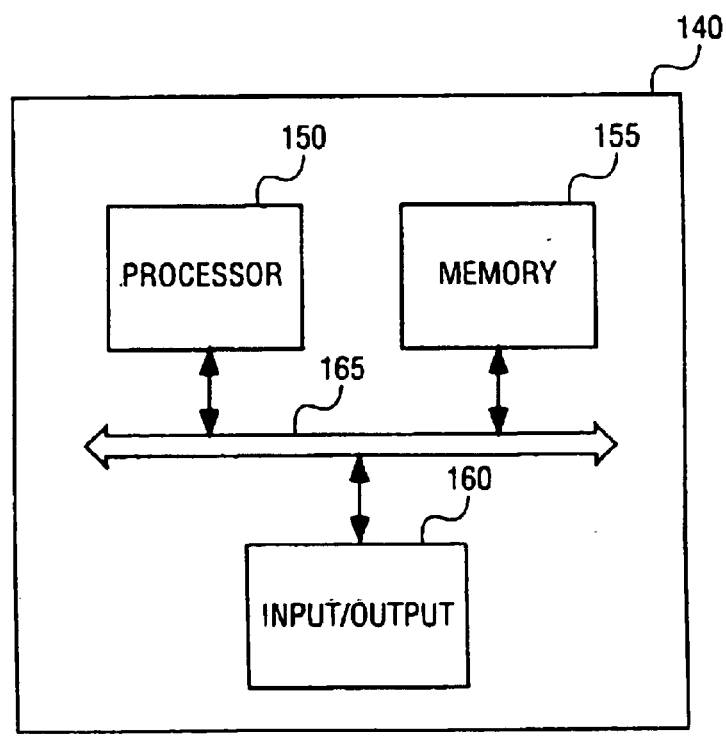

One embodiment of a computer system suitable for use as the digital image geographical special interest guide server computer 103 is illustrated in FIG. 1C. The computer system 140 includes a processor 150, memory 155 and input/output capability 160 coupled to a system bus 165. The memory 155 is configured to store instructions which, when executed by the processor 150, perform the methods described herein. The memory 155 may also store data and content related to the digital images, geographical map and categories. Input/output 160 provides for the delivery and display of digital image geographical special interest guide that is in a file or portions or representations thereof. Input/output 160 also encompasses various types of computer-readable media, including any type of storage device that is accessible by the processor 150.

One of skill in the art will immediately recognize that the term "computer-readable medium/media" further encompasses a carrier wave that encodes a data signal. It will also be appreciated that the server 103 is controlled by operating system software executing in memory 155. Input/output and related media 160 store the computer-executable instructions for the operating system and methods of the present invention as well as the data and content related to the digital image geographical special interest guide.

The description of FIGS. 1B–C is intended to provide an overview of computer hardware and other operating components suitable for implementing the invention, but is not intended to limit the applicable environments. It will be appreciated that the computer system 140 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

For example, assume that a user wants to post digital images of the Statue of Liberty on the geographical map of New York City created by the server 103. The user sends digital images of the Statue of Liberty to the server 103. The guide provider, through its server 103, charges the user for posting the digital images of the Statue of Liberty. The guide provider, includes an online service provider, a company or an individual. Alternatively, the guide provider, through its server 103, requests digital images from user of the system and compensates the users for submitting the digital images.

In one embodiment, a provider providing the digital image geographical request guide receives compensation for its services. The compensation can be in the form of a fee. For example, a fee is submitted to the guide provider through use of a credit card. In another example, the guide provider charges a fee for submission and provides the individual with digital images for downloading or allows the user to view the digital images online.

Alternatively, the guide provider can set up a competition or other rewards based digital images submitted by a user by evaluating the user's skill, technique, quality and several other criteria. The rewards could range from simple recognition on the web site, prizes, and/or cash. One of skill in the art will immediately conceive of many ways to determine the rewards, including votes by viewers of digital image geographical special interest guide and such alternate embodiments are contemplated as within the scope of the invention.

While the invention is not limited to any particular system configuration, for sake of clarity a simplified server having a receiving area and separate processing stage has been described. Also, it will be appreciated that digital images may be for a variety of categories and are not limited to digital images of landmarks or locations.

Figure 2:
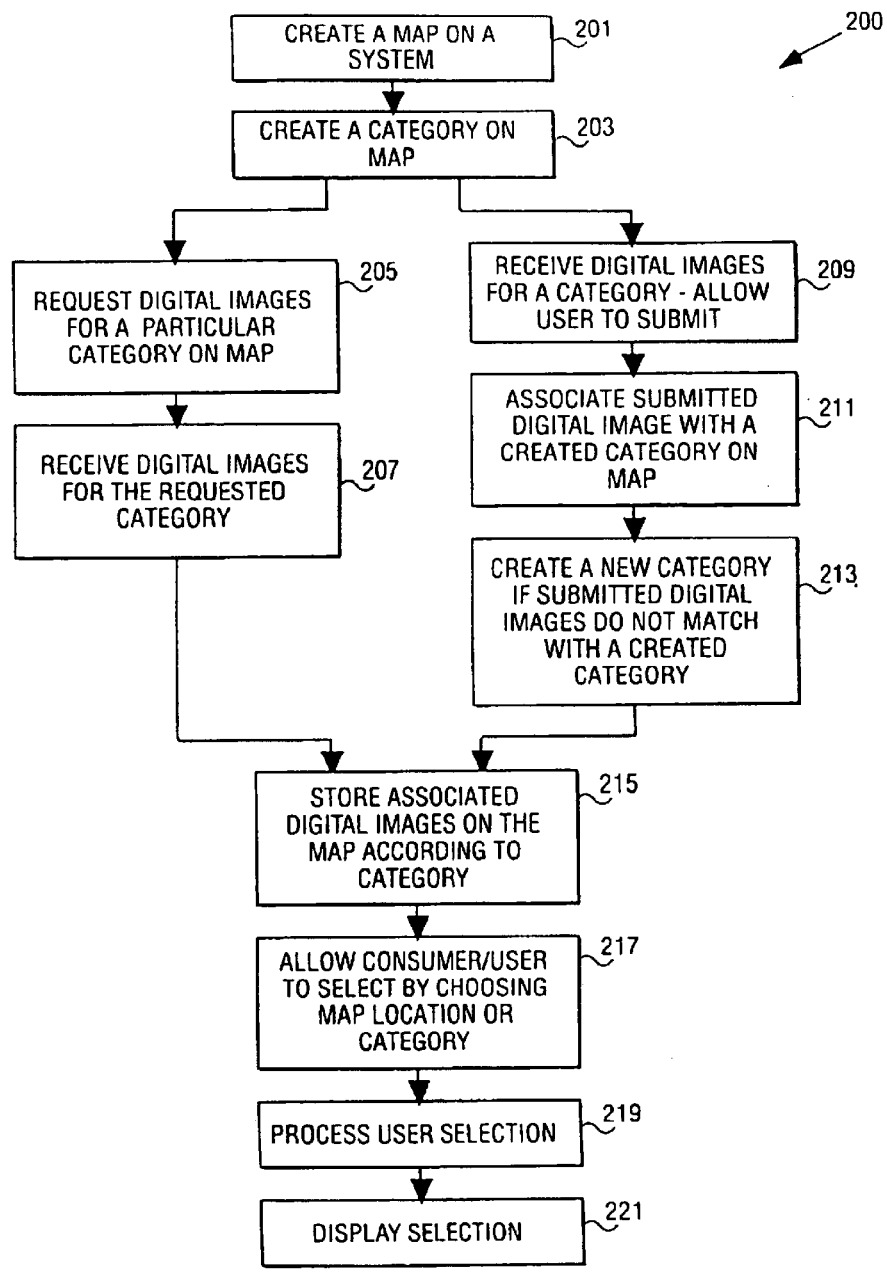
FIG. 2 is a flow diagram of one embodiment to generate a digital image geographical special interest guide.

FIG. 2 describes methods by reference to flow diagrams that enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems.

In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

FIG. 2 is a flow diagram according to one embodiment of a method 200 to generate a digital image geographical special interest guide. The method 200 can be implemented by digital processing system 140. Referring to FIG. 2, the operations describe acts that are performed for generating a digital image geographical special interest guide. At operation block 201, a geographical map is created, such as on an Internet Web Page. The geographical map can be of a geography map of United States, a geography map of the world, or a geography map of any individual or combination of countries. The geographical map allows a user of the digital image geographical special interest guide system to choose any area on the map and initiate the generation of a digital image geographical special interest guide.

At operation block 203, a category is created on the geographical map. A category corresponds to any group of places that have something in common. For example, a category can be created on the geographical map for locations in San Francisco for various restaurants. Another category can be created for the same locations in San Francisco for various landmarks, hotels, theatres, nightlife, resorts, shopping malls, bars, entertainment, and scenic spots. Therefore, a location on the geographical map such as San Francisco can have several categories. The category is created by the provider of the online service. Alternatively, users of the digital image geographical special interest guide can create the category.

At operation block 205, provider requests a user to submit digital images. The request can be for a particular location on the geographical map or can be for a particular category. Alternatively, the request can be for a particular location and a particular category at that particular location.

At operation block 207, the method 200 receives digital images from the user. The digital images correspond to the request made are operation block 205. An association is made by matching the received digital images with a category or location that was created to receive the type of digital images submitted. The method 200 rejects any digital images submitted in response to a request, as indicated at operation block 205, that do not correspond to the location or category of request. Alternatively, the method 200 directs the digital images that do not correspond to the request to their proper locations or categories on map. The decision to reject or accept and place in a separate category are made by the webmaster managing the server 103. For example, if the request is for sight seeing spots in San Francisco and a user submits digital images of the Sears Tower in Chicago, the submission is either rejected or placed on the geographical map at the location of Chicago under the landmark category by the webmaster managing the server 103. If a landmark category does not exist for the Chicago location on the geographical map, then a landmark category is created and the digital images of the Sears Tower are placed in the category.

Alternatively, operation blocks 209, 211 and 213 are executed when a user submits digital images to the digital image geographical special interest guide system. The submission is initiated by the user and is not in response to any request by the method 200.

In one embodiment, the user includes information that is related to the digital images. For example, the user submits information related to restaurants in Toronto, Canada, such as food menu, restaurant review by local magazines and newspapers, customer ratings and comments about the restaurant, restaurants most popular dishes, restaurant contact information, and online reservation options.

At operation block 209, the method 200 receives one or more digital images from a user of the digital image geographical special interest guide. As discussed previously, the method 200 receives information related to the digital images along with the digital images.

At operation block 211, the received digital images are associated with a location and/or category on the geographical map. For example, a user submits a digital image corresponding to any location on the geographical map such as Chicago, New York, Los Angeles, etc. Alternatively, the user submits a digital image corresponding to a category such as landmarks, restaurants, hotels, theatres, nightlife, resorts, shopping malls, bars, entertainment, scenic spots, etc. An association is determined based on the digital image submitted. If a digital image for a landmark is submitted, then it is associated with coordinates on the geographical map where the landmark exists and/or the landmarks category for that location. For example, if a user submits a digital image for a restaurant in Orlando, Fla. and there exits a category for restaurants in Orlando, then the digital images are associated with the map coordinates on the geographical map for Orlando, Fla., and/or with the restaurant category for the Orlando Fla. location on the geographical map.

At operation block 213, a new category is created if a digital image submitted by the user does not correspond to any category at a location. For example, if a user submits a digital image of a resort in Philadelphia, Pa., and a category for resorts does not exist for that location on the geographical map, then a category will be created for resorts on the location of the geographical map corresponding to Philadelphia Pa. The decision to create a new category is made by the webmaster managing the server 103.

After the digital images have been submitted, at operation block 215, the associated digital images are stored. In one embodiment, a hotlink is placed on the geographical map for accessing the digital images associated with the location on the geographical map. Alternatively, a legend of categories is created on the web page and a hotlink is created for each category in the legend. For example, a digital image for the Golden Gate Bridge in San Francisco is accessible to users by selecting a hotlink placed on the geographical map at coordinates corresponding to the Golden gate Bridge in San Francisco. Alternatively, digital images for the Golden Gate Bridge are accessible to users by selecting a hotlink placed in the legend for any one, or all, of the categories corresponding to scenic spots, landmarks or tourism.

At operation block 217, a user is provided access to the digital image geographical special interest guide. Access includes selecting a location on the map to request that the guide provider display digital images corresponding to the selected location. Access also includes selecting a category to request the provider to display digital images corresponding to a category. For example, a user may select a category that is available on the geographical map, such as National Parks, which requests the guide provider display digital images in all the locations on the geographical map corresponding to National Parks.

At operation block 219, the request to display digital images is processed by the method 200. Processing includes checking availability of digital images corresponding to the user's request, retrieving the available digital images, altering the geographical map, generating a digital image geographical special interest guide that includes digital images and related information, and optionally charging the user for displaying the requested digital images. Altering the geographical map consists of generating a map that is specific to a location. For example if a user selects San Diego on the geographical map, then the geographical map is altered to display map of San Diego. As discussed previously, charging may be in the form of a fee, or other commonly used methods of transactions.

At operation block 221, the requested digital images are displayed to the user. The digital images are transferred to a computer, TV, online service, or similar electronic instruments.

Figure 3:
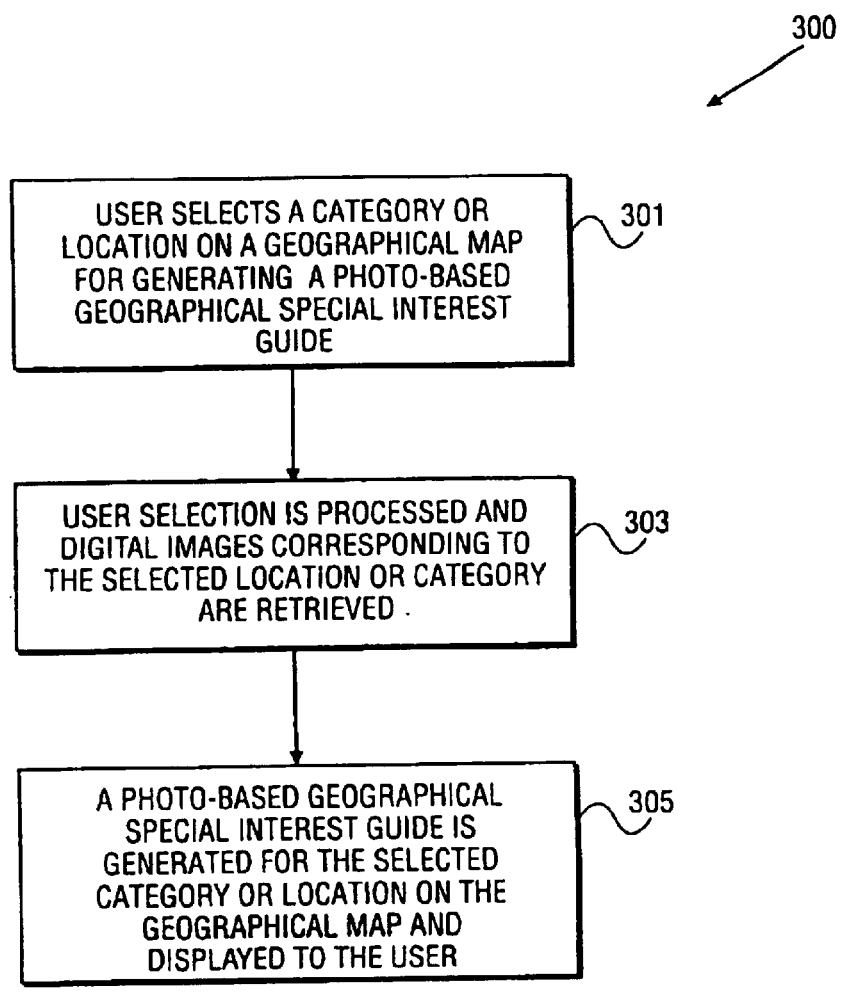
FIG. 3 is a flow diagram of one embodiment to generate a digital image geographical special interest guide.

FIG. 3 is a flow diagram according to one embodiment of a method 300 to generate a digital image geographical special interest guide. Operation 300 can be implemented by digital processing system 140. Referring to FIG. 3, the operations describe acts that are performed for generating a digital image geographical special interest guide. At operation block 301, a user selects a category or location on the geographical map by selecting the corresponding hotlink created by the guide provider. As previously described for FIG. 2.

At operation block 303, the user selected hotlink is processed to retrieve the digital images corresponding to the selected hotlink. Processing includes determining whether digital images for the selected location or category exist in storage. If they do not exist, then a prompt may be displayed to the user that no current digital images for the selected hotlinks exist. Alternatively, a prompt may also may also be displayed requesting the user to submit digital images related to the hotlink category. If the digital images for the selected category and/or location on the geographical map exist in storage, they are retrieved.

At operation block 305, a digital image geographical special interest guide is generated for the selected hotlink. As discussed previously the geographical map is altered to generate a digital image geographical special interest guide for a location. In one embodiment, the digital image geographical special interest guide is made available to the user after compensation is paid by the user to the digital image geographical special interest guide provider.

An online digital image geographical special interest guide has been described that allows users to display digital images corresponding to a location and/or category. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to networks is meant to include all of environments in which a server computer communicates with client computers to send and receive data. Therefore, it is manifestly intended that this invention be limited only by the following claims and equivalents thereof.

What is claimed is:

1. A computerized method for generating a digital image geographical special interest guide comprising:
   receiving digital images submitted by a user from an electronic device controlled by the user;
   processing the submitted digital images to associate the digital images with a category on a displayed geographical map; and
   providing a digital image geographical special interest guide for the category containing the associated digital images.

2. The computerized method of claim 1, wherein providing a digital image geographical special interest guide comprises:
   allowing selection of a category on the displayed geographical map;
   retrieving digital images associated with the selected category; and
   generating a digital image geographical special interest guide using the retrieved digital images.

3. The computerized method of claim 1, wherein the category is chosen from a group consisting of a geographical locations on a map, landmarks, restaurants, hotels, theatres, nightlife, resorts, shopping malls, bars, entertainment, and scenic spots.

4. The computerized method of claim 1, the electronic device being chosen from a group consisting of a stand alone computer, a networked system, and an online service.

5. The computerized method of claim 1, further comprising:
   generating a web page containing data that displays information chosen from the group consisting of digital image geographical special interest guide data, advertisements, banners, text, graphics, and hotlinks.

6. The computerized method of claim 1, further comprising storing the processed digital images.

7. The computerized method of claim 1, wherein provider the digital image geographical special interest guide comprises:
   associating the processed digital images with hotlinks; and
   enabling access of the digital images through the hotlinks.

8. The computerized method of claim 1, wherein providing the digital image geographical special interest guide comprises:
   enabling access to the digital image geographical special interest guide upon payment of a fee.

9. The computerized method of claim 1, further comprising compensating the user for submitting digital images to the digital image geographical special interest guide.

10. The computerized method of claim 1, further comprising receiving compensation for banner and advertisements posted on the digital image geographical special interest guide.

11. The computerized method of claim 1, wherein processing the digital images comprises:
    requesting digital images for a particular category on the digital image geographical special interest guide;
    receiving the requested digital images corresponding to the particular category; and
    associating the received digital images with the particular category.

12. The computerized method of claim 11, wherein requesting being performed by a server by posting data on an Internet web page indicating users to submit digital images corresponding to a category.

13. The computerized method of claim 11, wherein requesting being performed by a server by maintaining a list of prior users and sending email messages to the prior users indicating users to submit digital images corresponding to a category.

14. The computerized method of claim 1, further comprising:

associating the processed digital images with a location on the geographical map corresponding to the category; and altering the geographical map to represent digital images taken at particular locations of the geographical map.

15. The computerized method of claim 14, wherein associating further comprising:

allowing a user to submit digital images to the digital image geographical special interest guide; and associating the submitted digital images with a particular location on the geographical map.

16. The computerized method of claim 14, wherein associating further comprising:

allowing a user to submit digital images to the digital image geographical special interest guide; and associating the submitted digital images with a particular category of the digital image geographical special interest guide.

17. The computerized method of claim 14, wherein associating further comprises allowing users to display digital images corresponding to the particular category on the geographical map.

18. The computerized method of claim 14, wherein associating further comprises allowing users to display digital images corresponding to a geographical location on the geographical map.

19. A computerized system comprising:

a processor;

a memory coupled to the processor through a system bus;

a computer-readable medium coupled to the processor through the system bus; and a digital image geographical special interest guide module executed from the computer-readable medium by the processor to cause the processor to receive digital images submitted by a user from an electronic device controlled by the user, process the submitted digital images to associate the digital images with a category on a displayed geographical map, and provide a digital image geographical special interest guide for the category containing the associated digital images.

20. The computerized system of claim 19, wherein the digital image geographical special interest guide module causes the processor to allow selection of a category on the displayed geographical map, retrieve digital images associated with the selected category, and generate a digital image geographical special interest guide using the retrieved digital images.

21. The computerized system of claim 19, wherein the category is chosen from a group consisting of a geographical locations on a map, landmarks, restaurants, hotels, theatres, nightlife, resorts, shopping malls, bars, entertainment, and scenic spots.

22. The computerized system of claim 19, the electronic device being chosen from a group consisting of a stand alone computer, a networked system, and an online service.

23. The computerized system of claim 19, wherein digital image geographical special interest guide module causes the processor to generate a web page containing data that displays information chosen from the group consisting of digital image geographical special interest guide data, advertisements, banners, text, graphics, and hotlinks.

24. The computerized system of claim 19, wherein the digital image geographical special interest guide module causes the processor to store the processed digital images.

25. The computerized system of claim 19, wherein the digital image geographical special interest guide module causes the processor to associate the processed digital images with hotlinks, and enable access of the digital images through the hotlinks.

26. The computerized system of claim 20, wherein the digital image geographical special interest guide module causes the processor to enable access to the digital image geographical special interest guide upon payment of a fee.

27. The computerized system of claim 20, wherein the digital image geographical special interest guide module causes the processor to compensate the user for submitting digital images to the digital image geographical special interest guide.

28. The computerized system of claim 20, wherein the digital image geographical special interest guide module causes the processor to receive compensation for banner and advertisements posted on the digital image geographical special interest guide.

29. The computerized system of claim 20, wherein the digital image geographical special interest guide module causes the processor to request digital images for a particular category on the digital image geographical special interest guide, receive the requested digital images corresponding to the particular category, and associate the received digital images with the particular category.

30. The computerized system of claim 29, wherein the digital image geographical special interest guide module causes the processor to request by posting data on an Internet web page indicating users to submit digital images corresponding to a category.

31. The computerized system of claim 29, wherein the digital image geographical special interest guide module causes the processor to request by maintaining a list of prior users and sending email messages to the prior users indicating users to submit digital images corresponding to a category.

32. The computerized system of claim 20, wherein the digital image geographical special interest guide module causes the processor to associate the processed digital images with a location on the geographical map corresponding to the category, and alter the geographical map to represent digital images taken at particular locations of the geographical map.

33. The computerized system of claim 32, wherein the digital image geographical special interest guide module causes the processor to allow a user to submit digital images to the digital image geographical special interest guide, and associate the submitted digital images with a particular location on the geographical map.

34. The computerized system of claim 32, wherein the digital image geographical special interest guide module causes the processor to allow a user to submit digital images to the digital image geographical special interest guide, and associate the submitted digital images with a particular category of the digital image geographical special interest guide.

35. The computerized system of claim 32, wherein the digital image geographical special interest guide module causes the processor to allow users to display digital images corresponding to the particular category on the geographical map.

36. The computerized system of claim 32, wherein the digital image geographical special interest guide module causes the processor to allow users to display digital images corresponding to a geographical location on the geographical map.

37. A computer-readable medium having computer-executable instructions to cause a server computer to perform a method comprising:
- receiving digital images submitted by a user from an electronic device controlled by the user;
- processing the submitted digital images to associate the digital images with a category on a displayed geographical map; and
- providing a digital image geographical special interest guide for the category containing the associated digital images.

38. The computer-readable medium of claim 37, wherein providing a digital image geographical special interest guide further comprises:
- allowing selection of a category on the displayed geographical map;
- retrieving digital images associated with the selected category; and
- generating a digital image geographical special interest guide using the retrieved digital images.

39. The computer-readable medium of claim 37, wherein the category is chosen from a group consisting of a geographical locations on a map, landmarks, restaurants, hotels, theatres, nightlife, resorts, shopping malls, bars, entertainment, and scenic spots.

40. An apparatus for generating a digital image geographical special interest guide comprising:
- means for receiving digital images submitted by a user from an electronic device controlled by the user;
- means for processing the submitted digital images to associate the digital images with a category on a displayed geographical map; and
- means for providing a digital image geographical special interest guide for the category containing the associated digital images.

41. The apparatus of claim 40, wherein the means for providing a digital image geographical special interest guide comprises:
- means for allowing selection of a category on the displayed geographical map;
- means for retrieving digital images associated with the selected category; and
- means for generating a digital image geographical special interest guide using the retrieved digital images.

42. The apparatus of claim 40, further comprising:
- means for generating a web page containing data that displays information chosen from the group consisting of digital image geographical special interest guide data, advertisements, banners, text, graphics, and hotlinks.

43. The apparatus of claim 40, further comprising means for storing the processed digital images.

44. The apparatus of claim 40, wherein the means for processing the digital images comprises:
- means for requesting digital images for a particular category on the digital image geographical special interest guide;
- means for receiving the requested digital images corresponding to the particular category; and
- means for associating the received digital images with the particular category.

45. The apparatus of claim 40, further comprising:
- means for associating the processed digital images with a location on the geographical map corresponding to the category; and
- means for altering the geographical map to represent digital images taken at particular locations of the geographical map.

* * * * *